Figure 1:
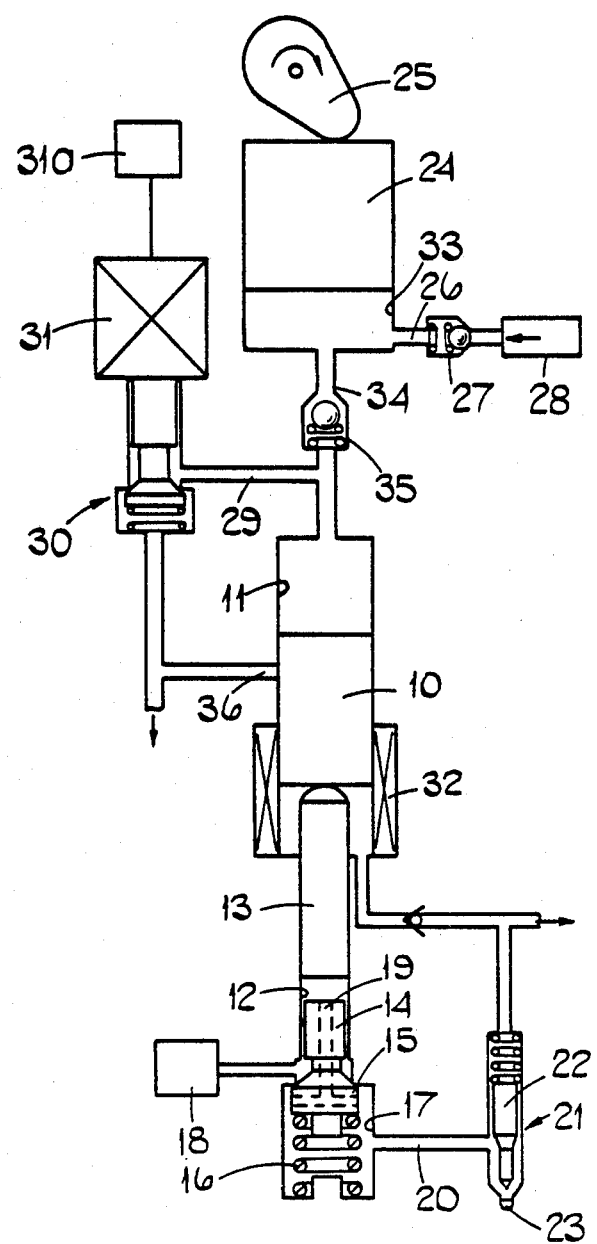

United States Patent [19]

Lakra

[11] 4,297,982
[45] Nov. 3, 1981

[54] FUEL INJECTION PUMPING APPARATUS

[75] Inventor: Paul Lakra, Wembley, England

[73] Assignee: Lucas Industries Limited, Birmingham, England

[21] Appl. No.: 141,158

[22] Filed: Apr. 17, 1980

[51] Int. Cl.³ ............................ F02D 1/02; F02D 5/02
[52] U.S. Cl. .................................. 123/502; 123/446; 123/506
[58] Field of Search ............... 123/445, 446, 447, 472, 123/501, 502, 506, 495, 497, 498, 499

[56] References Cited

U.S. PATENT DOCUMENTS

| | | | |
|---|---|---|---|
| 3,851,635 | 12/1974 | Murtin et al. ...................... | 123/499 X |
| 3,867,918 | 2/1975 | Williams et al. ................. | 123/497 X |
| 3,897,763 | 8/1975 | Williams et al. ................. | 123/497 X |
| 3,983,855 | 10/1976 | Jarrett .............................. | 123/498 X |
| 4,019,481 | 4/1977 | Lakra ................................. | 123/447 |
| 4,082,481 | 4/1978 | Fenne .............................. | 123/498 X |
| 4,091,784 | 5/1978 | Seilly et al. ...................... | 123/445 X |
| 4,173,208 | 11/1979 | Fenne et al. ..................... | 123/447 |
| 4,216,754 | 8/1980 | Lakra ................................ | 123/447 |

Primary Examiner—Tony M. Argenbright

[57] ABSTRACT

A fuel injection pumping apparatus includes a piston movable to displace a pumping plunger to deliver fuel through an outlet. Fuel can be supplied to the bore containing the plunger from a pressure source. The piston is moved by liquid under pressure delivered by a cam actuated piston the liquid flowing into the cylinder containing the piston by way of a non-return valve. A spill port is provided to allow surplus liquid to escape from the cylinder. Following movement of the piston by the cam movement of the piston is initiated by closure of a valve. The same valve is utilized to control the return motion of the plunger after the delivery of fuel has stopped.

9 Claims, 2 Drawing Figures

FUEL INJECTION PUMPING APPARATUS

This invention relates to a fuel injection pumping apparatus for supplying fuel to an injection nozzle of an internal combustion engine and of the kind comprising a piston means contained within a bore, an outlet from one end of the bore, said outlet in use communicating with an inlet of the nozzle, a fuel inlet to said one end of the bore connected in use to a source of fuel under pressure, a valve operable to prevent flow of fuel through said inlet during delivery of fuel through said outlet, a reciprocable plunger contained within a cylinder, cam means for urging the plunger towards one end of the cylinder, passage means connecting said one end of the cylinder with the other end of said bore whereby liquid displaced during movement of the plunger by the cam will act on said piston means to urge the piston to displace fuel through said outlet and a non-return valve in said passage means to prevent flow of liquid from said bore to said cylinder.

One example of such an apparatus is shown in the specification of British Pat. No. 861,754. In this case the delivery of fuel through the outlet always occurs at the same position of the cam irrespective of the speed of the associated engine and the quantity of fuel being supplied thereto. Moreover, the control of the amount of fuel suppled by the system is effected using a variable orifice through which fuel passes to the inlet of the bore. In this case the means of inducing a flow of fuel into the bore is by means of a spring which acts on the piston means. Adjustment of the timing of delivery of fuel is necessary in order to achieve correct operation of the associated engine and the method of controlling the amount of fuel supplied described in the aforesaid specification has disadvantages when the associated engine has a wide speed range.

A modification of the apparatus is shown in the specification of British Pat. No. 1,306,422. In this case an electromagnetic valve is provided to allow liquid to escape from between the plunger and piston means as the plunger is moved by the cam. This enables the timing of the delivery of fuel to be adjusted. Moreover, there is also provided a solenoid operated valve which controls the amount of fuel supplied to the bore. The control of the maximum fuel which can be delivered to the engine is effected by an adjustable stop which limits by its engagement with the piston, the maximum movement of the piston. The stop is adjustable by means of a rotary solenoid.

The system shown in specification 1306422 has important advantages over the system shown in specification 861754 in that it is possible to provide electronic control. There is however no indication of the amount of fuel being supplied to the engine and the system requires three solenoid operated devices to provide the required degree of control.

The object of the present invention is to provide a system of the kind specified in an improved form in which improved control of the quantity of fuel supplied by the apparatus is obtained using a solenoid operated valve with the same valve being utilized to enable variation of the timing of delivery of fuel to be obtained.

According to the invention an apparatus of the kind specified comprises a solenoid controlled valve operable to allow flow of liquid from the other end of said bore, a transducer for providing a signal indicative of the position of said piston means, a control circuit for controlling the operation of said valve, said control circuit receiving the signal from the transducer, first means for providing a demand signal to said control circuit, second means for providing an engine speed signal to said control circuit, third means for providing an engine position signal to the control circuit, whereby during movement of the plunger by the cam the valve is closed at a position to cause delivery of fuel at the desired time, and whereby during filling of the bore the valve is closed when the piston means attains a position appropriate to the amount of fuel to be delivered to the engine.

Figure 2:
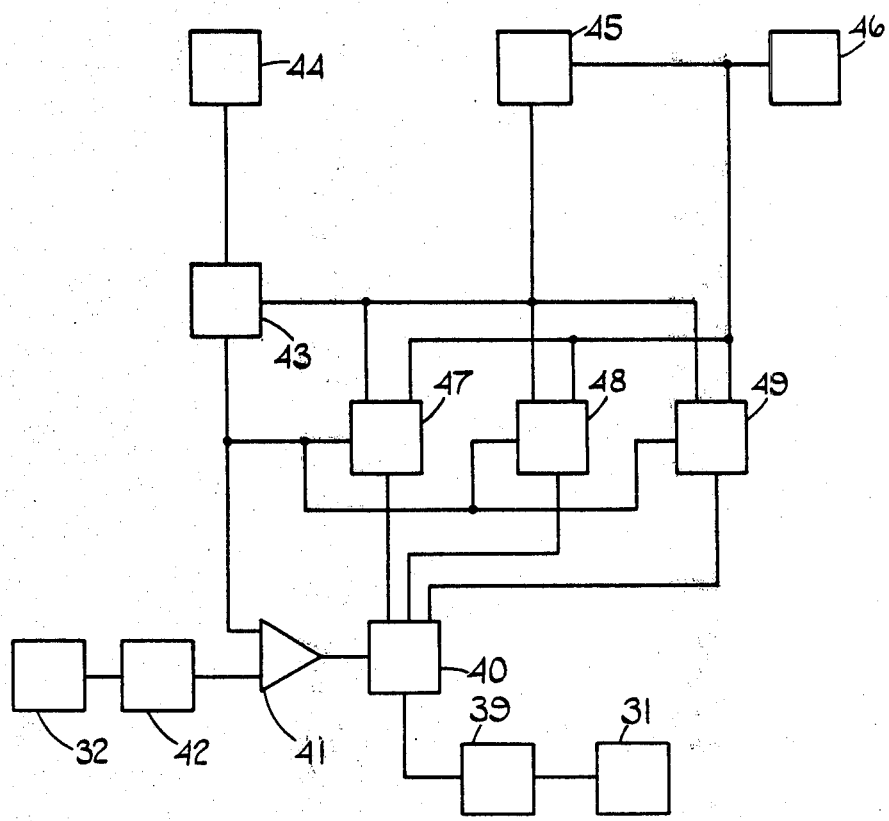

In the accompanying drawings:

FIG. 1 is a diagrammatic representation of one example of an apparatus according to the invention; and FIG. 2 is a block diagram of a part of the system of FIG. 1.

With reference to FIG. 1 of the drawings a piston 10 is provided and which is movable in a bore 11 the latter having a reduced portion 12 in which is located a further piston 13 which is engaged by the piston 10. Moreover, located in the bore 12 is a valve body 14 having a head 15. The head 15 is of larger diameter than the main portion of the valve body and it is urged by means of a coiled compression spring 16 into contact with a seating defined about an enlarged portion 17 of the bore 12. An annular space is defined between the valve body 14 and the enlarged portion 17 of the bore and this space communicates with a source 18 of liquid fuel. Moreover, formed in the body of the valve is a longitudinal passage 19 which communicates with an outlet 20.

The outlet 20 communicates with the fuel inlet of a fuel injection nozzle 21 which itself includes a spring loaded valve member 22 which controls the flow of fuel derived from the outlet 20, through outlet orifices 23 the latter in use, being open to the combustion chamber of the associated engine.

A cylinder 33 is provided and in this cylinder is located a pumping plunger 24 which is acted upon by means of a cam 25 which is driven at half engine speed and in timed relationship thereto. The cylinder communicates with the bore 11 by way of a non-return valve 35 located in a passage 34 and by way of a non-return valve 27 in a passage 26, with a source 28 of fuel under pressure.

The chamber of the injector 21 which contains the spring is preferably connected to a drain as also is an annular space defined between the piston 13 and the bore 11.

A branch passage 29 communicates with the bore 11 and can be placed in communication with a drain by means of a valve 30 which is closed by a valve operator in the form of an electromagnetic device 31. The valve is closed when a solenoid of the device is energised. The supply of electric current to the device 31 is controlled by a control circuit 31a to which as will be explained, are also fed signals representing engine speed, position, actual fuel quantity and the demanded fuel.

In FIG. 1 the parts of the apparatus are shown in the position they occupy during the delivery of fuel to the associated engine. The pumping plunger 24 is being moved downwardly and the valve 30 is closed so that a high pressure exists in the space between the plunger 24 and the piston 10. The latter is therefore moving at a greater rate than the plunger 24 because its diameter is smaller than that of the plunger and similar movement is being imparted to the piston 13. This latter piston displaces fuel from the bore 12 through the passage 19 to the outlet 20 and the high pressure at the outlet 20 is shown to have lifted the valve member of the injection nozzle away from its seating to permit fuel flow through the outlet orifices 23.

As the cam 25 further rotates a position will be reached at which the piston 13 engages the body of the valve 14 to physically lift the head 15 of the valve away from the seating. When this occurs the pressure at the outlet 20 falls and the valve member 22 of the injection nozzle moves onto its seating to prevent further flow of fuel through the outlet orifices. The surplus fuel displaced from the bore 12 flows to the source 18 and the surplus fuel displaced by the plunger 24 flows to drain through the port 36 when the latter has been uncovered by the piston 10.

After the inward movement of the plunger 24 has ceased and the cam 25 has moved angularly fuel flows from the source 28 past the non-return valve 27 to intermediate the piston 10 and the plunger 24 and the latter is moved rearwardly to maintain engagement with the cam. The valve 35 is set so that it cannot be opened by the pressure of fuel of the source 28.

Filling of the bore 12 with fuel takes place at any convenient time before the next delivery of fuel is required. To achieve filling the valve 30 is opened to allow fuel flow from the source 18, between the head of the valve 14 and the seating, through the bore 19 in the valve and into the bore 12 thus displacing the pistons 13 and 10. The valve 14 is maintained in the open position because whilst the pistons move the valve is not pressure balanced. The extent of movement of these pistons is sensed by means of a sensing transducer 32 positioned about the piston 10. As soon as the signal from the sensing coil of the transducer indicates that the pistons 13 and 10 have moved in the opposite direction to the direction in which they move during fuel delivery by a sufficient amount the valve 30 is closed and the pressure in the portion of the bore 11 and cylinder between the piston 10 and plunger 24 rises to a pressure which is above drain pressure and as a result the pressure in the bore 12 also rises. This increase in pressure permits the valve 14 to close so that no further fuel is admitted to the bore 12.

When the plunger 24 starts to move under the action of the cam and starts to generate a pressure intermediate the piston 10 and plunger 24, the valve 30 is opened and fuel flows from intermediate the plunger 24 and the piston. The point at which the valve 30 is opened may be varied with speed to ensure that the pressure between piston 10 and plunger 24 is high enough to prevent the pressure of fuel of the source 18 opening the valve 14 and pushing plungers 10 and 13 upwards. No movement of the piston 10 occurs until the valve 30 is closed. Thereafter the cycle of operation as described, is repeated.

It is possible to obtain pilot injection of fuel by momentarily closing the valve 30 sufficient to effect a small movement of the pistons 10 and 13.

Turning now to FIG. 2 of the drawings there is shown the control circuit 31a. Forming part of the circuit is a drive circuit 39 for the electromagnetic device 31, the drive circuit being controlled by a logic circuit 40. The logic circuit receives four control signals the first of which is provided by a comparator 41 which compares a required fuel signal with an actual fuel signal derived by way of buffer circuit 42 from the coil of the transducer 32. The required fuel signal is provided by a governor circuit 43 which receives a demanded fuel signal from a transducer 44 which may for example be associated with the throttle pedal of the vehicle driven by the associated engine. In order to determine the required fuel signal the governor circuit is also supplied with a signal indicative of the speed of the associated engine. This signal is obtained from a circuit 45 which receives pulses at predetermined intervals of rotation of a rotary part of the engine, for example the flywheel of the engine. The pulses are provided by a transducer 46. The governor circuit may receive other engine condition signals for example temperature and its output that is the required fuel signal, is adjusted to ensure that the maximum allowed engine speed is not exceeded and the maximum fuel level is not exceeded.

The signal provided by the comparator 41 to the logic circuit determines the point during the filling cycle at which the valve 30 is closed to halt the movement of the pistons 10, 13.

The second signal supplied to the logic circuit is provided by a timing circuit 47. This signal also effects closure of the valve 30 but this time it is during the delivery cycle when closure of the valve causes movement of the pistons 10, 13. In other words the timing circuit 47 determines the timing of delivery of fuel to the associated engine. The timing circuit receives the required fuel signal, the speed signal and also the engine position signal.

The third signal to the logic circuit 40 is provided by a timing circuit 48 and this provides a signal to effect opening of the valve 30 to start the filling cycle. It has been mentioned that filling of the bore 12 can take place at any time between following delivery cycles, but it is desirable that it should take place as late as possible before delivery of fuel is required. It has been found that this improves the governing action. As with the timing circuit 47, the timing circuit 48 is provided with the engine position signal and also the engine speed signal. The latter signal is required to take care of the fact that the time during which filling takes place decreases as the engine speed increases. The timing circuit 48 is also provided with the required quantity signal since the time required to effect filling of the bore 12 depends upon the amount of fuel required.

The fourth signal supplied to the logic circuit 40 is provided by a timing circuit 49 and the signal provided by the circuit effects opening of the valve 30 to prevent movement of the pistons 10, 13 as the plunger 24 is moved by the cam 25. The circuit 49 is provided with the engine position signal and also with the speed signal. The speed signal is required in order to compensate for the delay between the application of the signal to the logic circuit and the opening of the valve 30. The operation of the valve 30 at this point is critical because if it opens too early the pistons 10, 13 may start to move in the direction to allow more fuel into the bore 12 or if the valve opens too late the pistons may move in the direction to deliver fuel. The circuit 49 as shown is also provided with the required fuel signal since the amount of fuel contained in the bore 11 has an influence on the instant the valve 30 needs to be opened.

The timing circuits 47, 48 and 49 from the inputs supplied to them determine the times at which their output signals should occur. For this purpose the circuits may calculate the desired time taking into account the delay in the response of the valve or they may be in the form of "timing maps" which contain stored information.

If pilot injection is required this may be effected by modifying the timing circuit 47 to provide an initial valve closure signal after which the valve is opened, followed by the main closure signal.

I claim:

1. A fuel injection pumping apparatus for supplying fuel to an injection nozzle of an internal combustion engine comprising piston means contained within a bore, an outlet from one end of the bore, said outlet in use communicating with an inlet of the nozzle, a fuel inlet to said one end of the bore connected in use to a source of fuel under pressure, a valve operable to prevent flow of fuel through said inlet during delivery of fuel through said outlet, a reciprocable plunger contained within a cylinder, cam means for urging the plunger towards one end of the cylinder, passage means connecting said one end of the cylinder with the other end of said bore whereby liquid displaced during movement of the plunger by the cam will act on said piston means to urge the piston to displace fuel through said outlet, a non-return valve in said passage means to prevent flow of liquid from said bore to said cylinder, a solenoid controlled valve operable to allow flow of liquid from the other end of said bore, a transducer for providing a signal indicative of the position of said piston means, a control circuit for controlling the operation of said valve, said control circuit receiving the signal from the transducer, first means for providing a demand signal to said control circuit, second means for providing an engine speed signal to said control circuit, third means for providing an engine position signal to the control circuit, whereby during movement of the plunger by the cam the valve is closed at a position to cause delivery of fuel at the desired time, and whereby during filling of the bore, the valve is closed when the piston means attains a position appropriate to the amount of fuel to be delivered to the engine.

2. An apparatus according to claim 1 including an inlet for liquid to said one end of the cylinder, a non-return valve in said inlet, said inlet in use being connected to a source of liquid under pressure, to urge the plunger into contact with the cam when the non-return valve in said passage means is closed.

3. An apparatus according to claim 1 or claim 2 including a spill port in the wall of said bore, said spill port being uncovered by said piston means at a predetermined position during the movement of the piston means towards said one end of the bore.

4. An apparatus according to claim 3 in which said control circuit includes a governor circuit which receives said demand signal and the engine speed signal and which provides an output representing the required fuel signal, a comparator for comparing the required fuel signal with the signal from said transducer to provide a signal during the supply of fuel to the bore, to effect closure of the valve when the required quantity of fuel has flowed into the bore.

5. An apparatus according to claim 4 including first, second and third timing circuits which receive said engine position signal, said first timing circuit providing a signal to close said valve to cause delivery of fuel through said outlet, said second timing circuit providing a signal to open said valve to allow flow of fuel into said said bore and said third timing circuit providing a signal to open said valve when the plunger is moved towards said one end of the cylinder by the cam.

6. An apparatus according to claim 5 in which said first timing circuit receives the required fuel signal from the governor circuit and also the engine speed signal, said first timing circuit determining the required instant of delivery of fuel.

7. An apparatus according to claim 6 in which said second timing circuit also receives the engine speed signal and the required fuel signal, said second timing circuit varying the instant at which the valve is opened to allow fuel supply to the bore to ensure that there is adequate time to allow the required quantity of fuel to flow to the bore.

8. An apparatus according to claim 7 in which said third timing circuit also receives the engine speed signal and the required fuel signal.

9. An apparatus according to claim 8 in which the outputs from the comparator and said first, second and third timing circuit are supplied to a logic circuit the output of which controls the operation of a drive circuit.

* * * * *